(12) United States Patent
Coffman

(10) Patent No.: US 12,018,739 B2
(45) Date of Patent: Jun. 25, 2024

(54) MODIFIED DIFFERENTIAL INTERNALS SYSTEM AND METHOD

(71) Applicant: Joseph Coffman, Grain Valley, MO (US)

(72) Inventor: Joseph Coffman, Grain Valley, MO (US)

( * ) Notice: Subject to any disclaimer, the term of this patent is extended or adjusted under 35 U.S.C. 154(b) by 0 days.

(21) Appl. No.: 18/310,683

(22) Filed: May 2, 2023

(65) Prior Publication Data

US 2023/0358303 A1 Nov. 9, 2023

Related U.S. Application Data

(60) Provisional application No. 63/364,222, filed on May 5, 2022.

(51) Int. Cl.
| | |
|---|---|
| *F16H 48/16* | (2006.01) |
| *F16H 48/38* | (2012.01) |
| *F16H 48/12* | (2012.01) |

(52) U.S. Cl.
CPC .............. *F16H 48/38* (2013.01); *F16H 48/12* (2013.01); *F16H 48/16* (2013.01); *F16H 2048/385* (2013.01)

(58) Field of Classification Search
CPC ..... F16H 2057/0075; F16H 2057/0068; F16H 48/12; F16H 48/16; F16H 48/19; F16H 57/03; F16H 48/38; F16H 2048/385; F16H 48/40
See application file for complete search history.

(56) References Cited

U.S. PATENT DOCUMENTS

| | | | | |
|---|---|---|---|---|
| 3,344,686 | A * | 10/1967 | Baker ................... | F16D 41/069 192/50 |
| 6,622,837 | B2 * | 9/2003 | Ochab ................ | B60K 17/3515 74/650 |
| 6,976,929 | B1 * | 12/2005 | Bonanti ................. | F16H 48/08 475/230 |

(Continued)

FOREIGN PATENT DOCUMENTS

| | | | |
|---|---|---|---|
| DE | 3215430 A1 | * | 10/1983 |
| GB | 155139 A | * | 12/1920 |

OTHER PUBLICATIONS https://sandcraftmotorsports.com/product/diy-gen-2-bulletproof-front-diff-kit-2017-2020-xp-1000-2017-2020-xp-turbo/; believed to be on sale by others prior to May 4, 2022.

(Continued)

*Primary Examiner* — Sherry L Estremsky
(74) *Attorney, Agent, or Firm* — AVEK IP, LLC; Kent R. Erickson

(57) ABSTRACT

A modified differential internal system for a vehicle differential may include a preexisting ring gear having a perimeter. The system may include a ring gear sleeve having a thickness, the ring gear sleeve being affixed to the ring gear perimeter. The system may include a spring retainer having a first surface and a second surface, the first surface having a first set of lugs and the second surface having a second set of lugs. The system may include an armature plate having a plurality of slots configured to engage the first set of lugs, and a sprag plate having a plurality of slots configured to engage the second set of lugs. The sprag plate may have a plurality of locking tabs configured to engage a sprag cage of the vehicle differential.

19 Claims, 23 Drawing Sheets

(56) References Cited

U.S. PATENT DOCUMENTS

| | | | |
|---|---|---|---|
| 8,840,514 B1* | 9/2014 | Knickerbocker | B60K 17/26 |
| | | | 475/220 |
| 11,161,407 B2 | 11/2021 | Coffman | |
| 11,236,811 B1* | 2/2022 | Hasson, Jr. | B60K 17/346 |

OTHER PUBLICATIONS https://www.hdextremeoffroad.com/product-category/online-store/product-category-online-store-rzr/polaris-rzr-1000/differential-front-polaris-rzr-1000/; believed to be on sale by others prior to May 4, 2022.

* cited by examiner

MODIFIED DIFFERENTIAL INTERNALS SYSTEM AND METHOD

CROSS REFERENCE TO RELATED APPLICATIONS

This application claims priority to U.S. Provisional Patent Application No. 63/364,222, filed May 5, 2022, the disclosure of which is incorporated herein in its entirety by reference.

FIELD OF INVENTION

This disclosure relates to differential systems, and more specifically, to modified internals of a differential system that mitigate mechanical failure of the differential.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

In some aspects, the techniques described herein relate to a modified internals system for a vehicle differential, the system including: a preexisting ring gear having a perimeter; a ring gear sleeve having a thickness, the ring gear sleeve being affixed to the ring gear perimeter; a spring retainer having a first surface and a second surface, the first surface having a first set of lugs and the second surface having a second set of lugs; an armature plate having a plurality of slots configured to engage the first set of lugs; and a sprag plate having a plurality of slots configured to engage the second set of lugs, the sprag plate having a plurality of locking tabs configured to engage a sprag cage of the vehicle differential.

In some aspects, the techniques described herein relate to a system wherein the armature plate and the sprag plate are machined from preexisting parts.

In some aspects, the techniques described herein relate to a system, wherein the first surface of the spring retainer extends perpendicularly from the second surface of the spring retainer.

In some aspects, the techniques described herein relate to a system, wherein the thickness of the ring gear sleeve is about 0.43 mm.

In some aspects, the techniques described herein relate to a system, wherein the ring gear sleeve is affixed to the ring gear perimeter via welding.

In some aspects, the techniques described herein relate to a system, further including a plurality of drive hubs configured to engage the sprag cage of the vehicle differential.

In some aspects, the techniques described herein relate to a system, further including a drive hub pin, wherein each of the plurality of drive hubs has a bore formed therein configured to fit the drive hub pin.

In some aspects, the techniques described herein relate to a system, wherein the armature plate is configured to translate motion from the ring gear to both the spring retainer and the sprag plate, and the sprag plate is operably coupled to the plurality of drive hubs.

In some aspects, the techniques described herein relate to a system, wherein the spring retainer is configured to dampen the motion translated from the ring gear to the sprag plate.

In some aspects, the techniques described herein relate to a system, wherein the locking tabs of the sprag plate are formed a distance from an inner perimeter of the sprag plate.

In some aspects, the techniques described herein relate to a system, wherein the sprag plate is welded to the sprag cage.

In some aspects, the techniques described herein relate to a system, wherein the armature plate is configured to fit around the ring gear sleeve affixed to the ring gear.

In some aspects, the techniques described herein relate to a system, wherein the spring retainer is configured to fit around the ring gear sleeve affixed to the ring gear.

In some aspects, the techniques described herein relate to a system, wherein the ring gear sleeve thickness is about equal to a thickness of a cylindrical wall of the ring gear.

In some aspects, the techniques described herein relate to a method of modifying internals of a vehicle differential, the method including the steps of: welding a ring gear sleeve having a thickness to a perimeter of a preexisting ring gear; providing a spring retainer, the spring retainer having a first surface and a second surface, the first surface having a first set of lugs and the second surface having a second set of lugs; machining an armature plate, the armature plate having a plurality of slots configured to engage the first set of lugs; machining a sprag plate, the sprag plate having a plurality of slots configured to engage the second set of lugs and having a plurality of locking tabs configured to engage a sprag cage of the vehicle differential; and assembling each of the ring gear, the spring retainer, the armature plate, and the sprag plate within the vehicle differential.

In some aspects, the techniques described herein relate to a method, wherein the armature plate and the sprag plate are machined from preexisting parts.

In some aspects, the techniques described herein relate to a method, further including the step of machining a plurality of drive hubs by forming a bore in each of the plurality of drive hubs.

In some aspects, the techniques described herein relate to a modified internals system for a vehicle differential, the system including: a ring gear having a cylindrical wall and a perimeter, the cylindrical wall having a first thickness; a ring gear sleeve having a second thickness, the ring gear sleeve being welded to the ring gear perimeter; a spring retainer having a first surface and a second surface extending perpendicularly from the first surface, the first surface having a first set of lugs extending in a direction, and the second surface having a second set of lugs extending in the direction; an armature plate having a plurality of slots configured to engage the first set of lugs and an inner perimeter configured to fit around the ring gear sleeve; a sprag cage having rollers; and a sprag plate having a plurality of slots configured to engage the second set of lugs, the sprag plate having a plurality of locking tabs configured to engage the sprag cage.

In some aspects, the techniques described herein relate to a system, wherein the first thickness and the second thickness are equivalent.

In some aspects, the techniques described herein relate to a system, further including: a plurality of drive hub pins configured to operably couple to the sprag cage; and an oil spacer configured to fit between drive hubs of the plurality of drive hub pins.

BACKGROUND

Side-by-side, off-highway vehicles, also known as UTVs, are very popular as both work and entertainment vehicles. One popular line of UTVs is the RZR line from Polaris Industries, Inc. of Medina, Minnesota.

UTV's make use of one or more differentials (see FIGS. 1 and 2) in their drive systems to deliver power from the UTV engine to the axles. Differentials are typically complex devices that involve numerous interlocking parts. These differential parts undergo a tremendous amount of wear and stress, especially when engaging in off-road driving activity. Conventional differential parts may fail under these conditions (e.g., a ring gear of the differential may develop cracks or fractures under stress). However, due to the complexity of the differential internals, modifying just one differential part to preclude mechanical failure is no easy task. A change to one differential part may require a cascade of additional changes to other parts of the differential. Furthermore, users of preexisting differentials generally have no way of improving their current differentials besides replacing them entirely, which is often costly.

What is needed is a way to readily modify the original, inferior differential, to reinforce the differential against mechanical failure without having to replace the entire device.

DESCRIPTION OF THE DRAWINGS

Illustrative embodiments are described in detail below with reference to the attached drawing figures, and wherein.

DETAILED DESCRIPTION

The subject matter of select exemplary embodiments is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" or "substantially" as used herein denote deviations from the exact value by +/−10%, preferably by +/−5% and/or deviations in the form of changes that are insignificant to the function.

Figure 1:
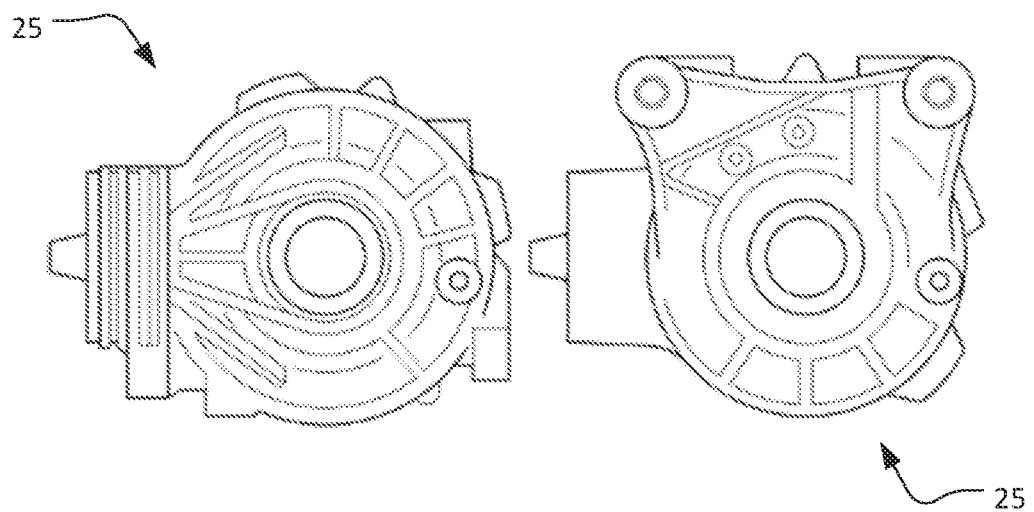
FIG. 1 is a perspective view of a prior art vehicle differential.
Figure 2:
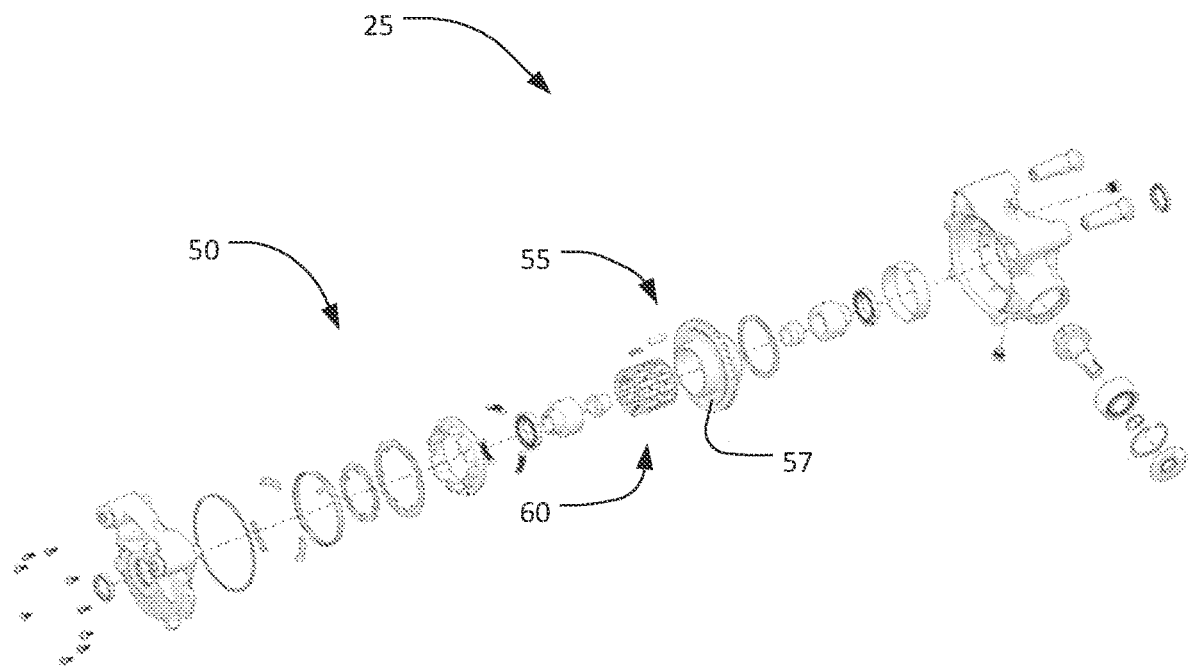
FIG. 2 is an exploded view of the prior art vehicle differential of FIG. 1.
Figure 3:
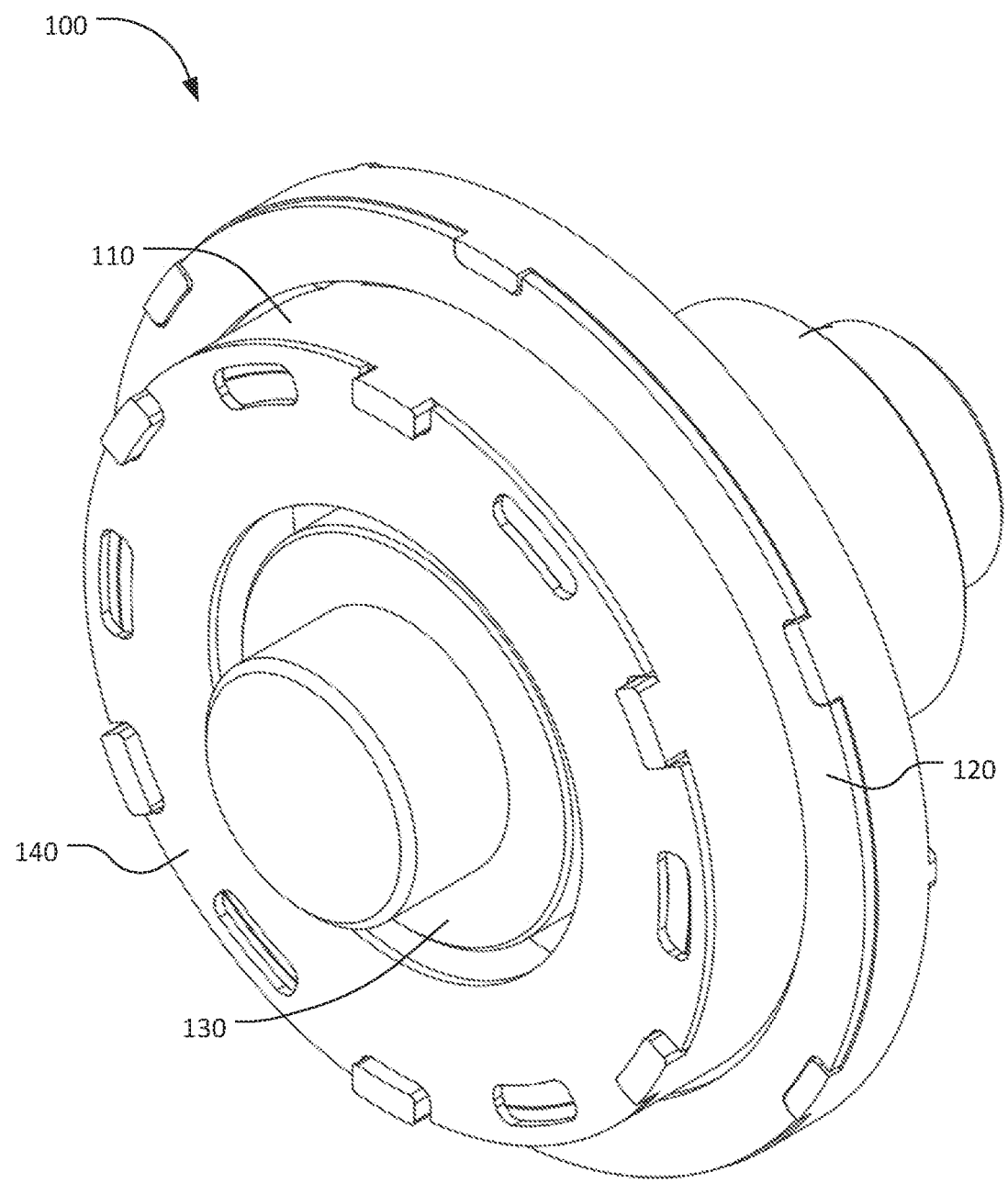
FIG. 3 is a perspective view of modified differential internals according to an embodiment of the present disclosure.
Figure 4A:
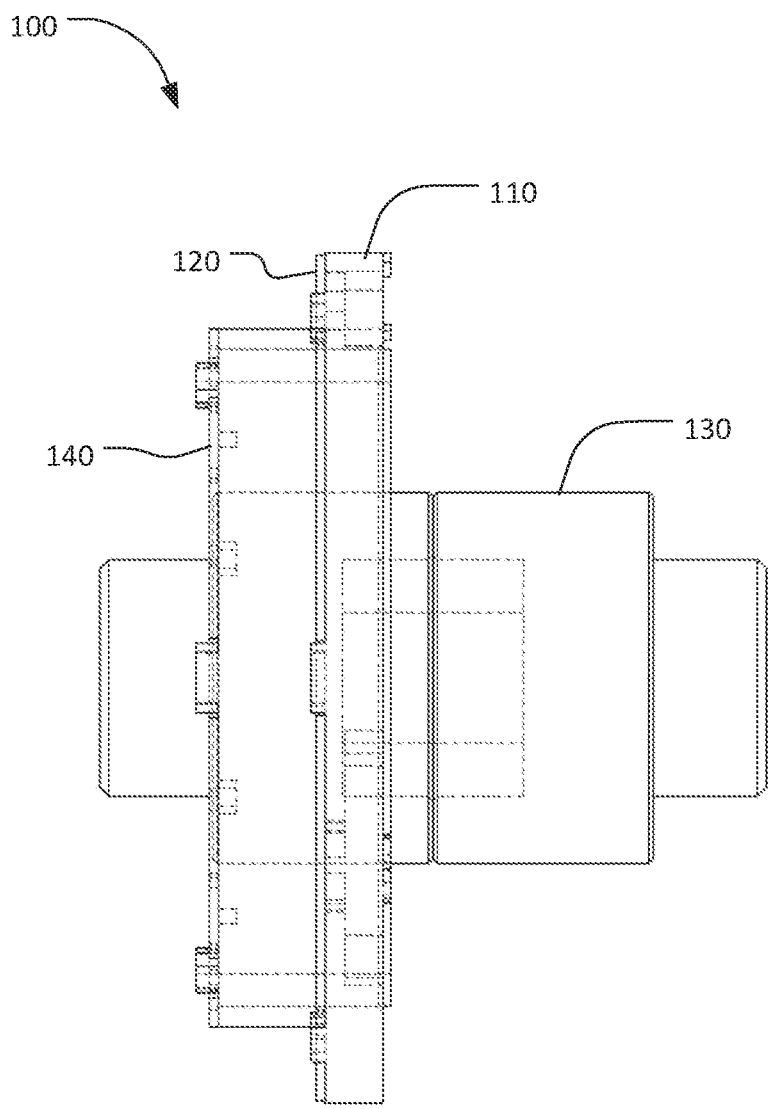
FIG. 4A is a side view of the modified differential internals of FIG. 3.
Figure 4B:
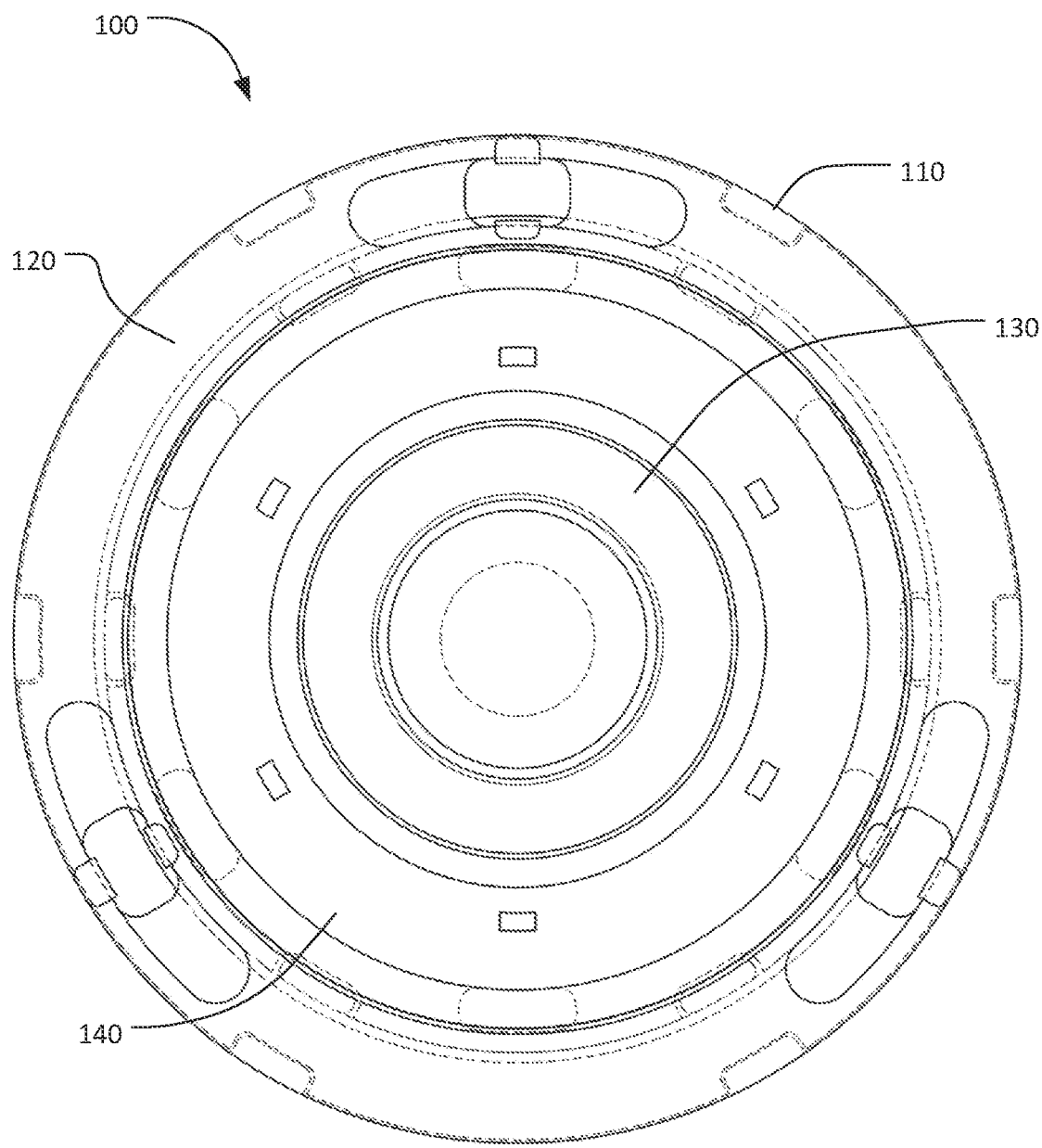
FIG. 4B is a bottom view of the modified differential internals of FIG. 3.
Figure 4C:
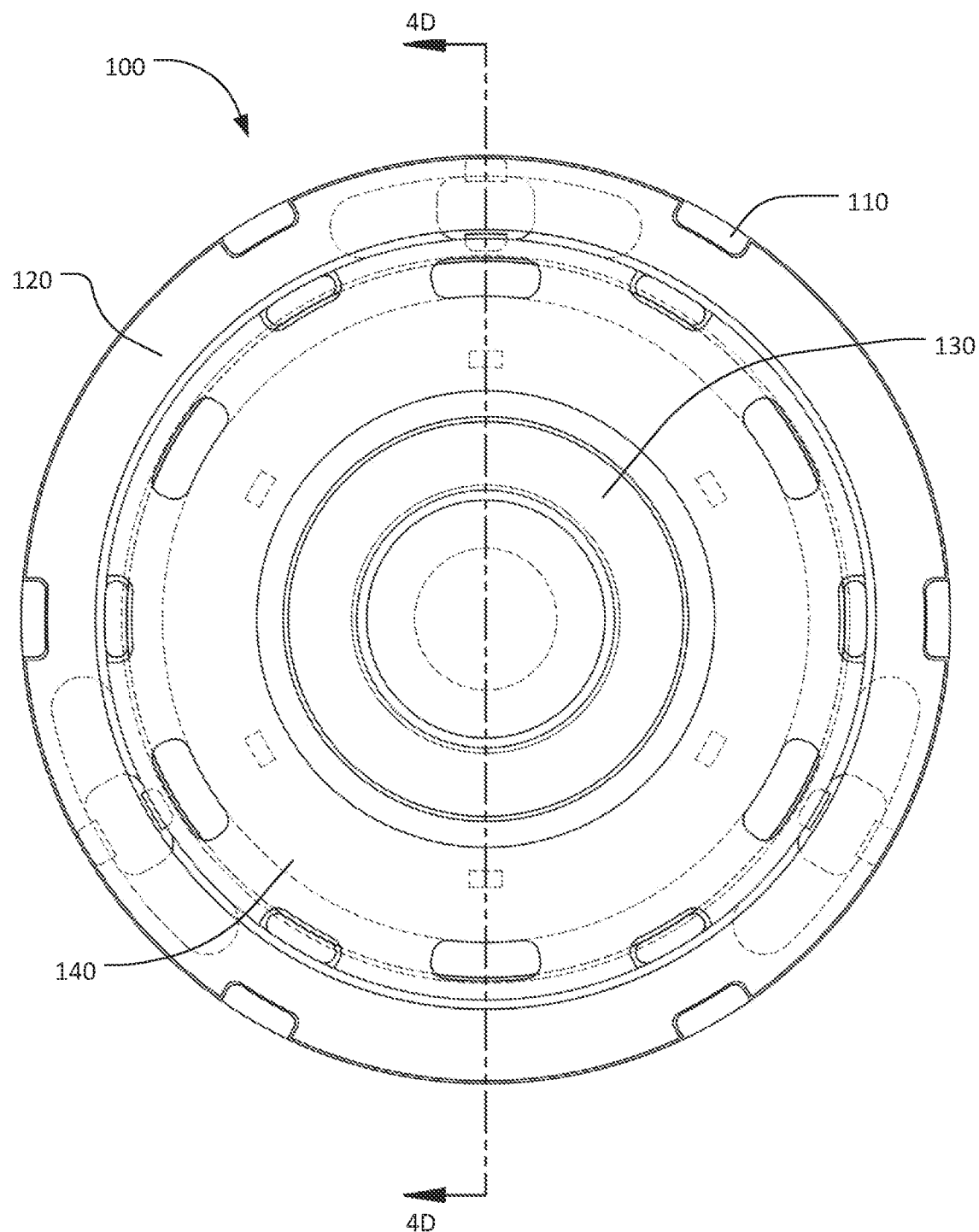
FIG. 4C is a top view of the modified differential internals of FIG. 3.
Figure 4D:
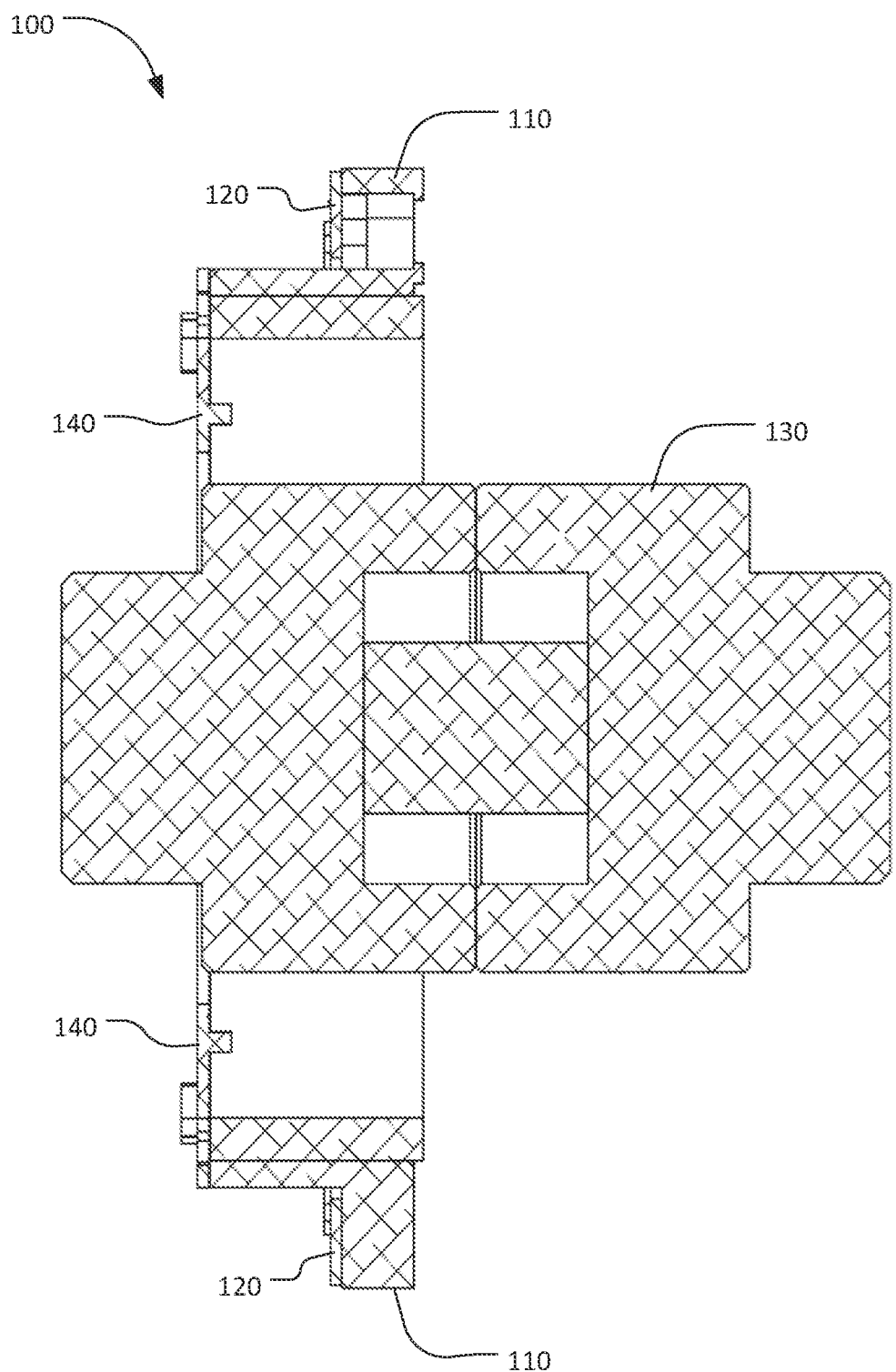
FIG. 4D is a section view of the modified differential internals of FIG. 4C.
Figure 5A:
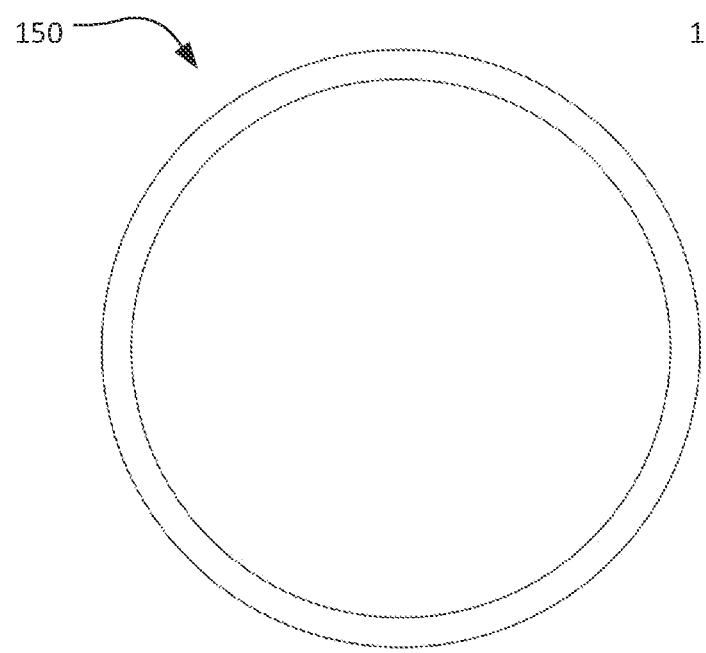
FIG. 5A is a top view of a ring sleeve of the modified differential internals of FIG. 3.
Figure 5B:
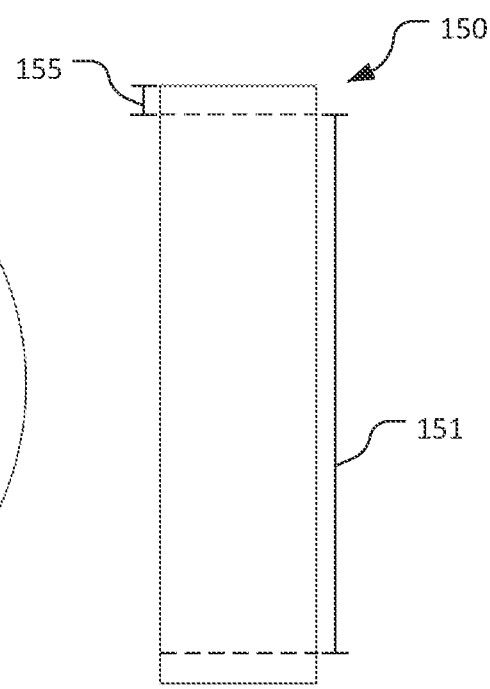
FIG. 5B is a side view of the ring sleeve of the modified differential internals of FIG. 3.

FIGS. 1 and 2 show an example prior art vehicle differential 25 having conventional differential internals 50. The conventional differential internals 50 may include, for example a conventional ring gear 55 and a sprag cage 60 having roller bearings. The conventional vehicle differential 25 typically operates by having a pinion or side gear driven by a vehicle engine, which in turn drives the ring gear 55. The turning of the ring gear 55 may translate to an armature plate of the differential 25. This armature plate may also be engaged by one or more magnets of a side cover of the differential 25. The armature plate may also be coupled with both a spring retainer and a sprag plate of the differential 25, and the rotation of the armature plate may drive both these parts. The spring retainer may have one or more springs or other damping devices which dampen the motion of the armature plate. That is to say, the spring retainer dampens the rotation of the armature plate such that the sprag plate does not receive the full motion thereof.

The conventional sprag plate responds to this received dampened rotation by rotating the sprag cage 60 with rollers. The rotating sprag cage 60 engages a drive hub of the differential 25, which itself is engaged with an axle of the vehicle. As such, the original motion provided by the vehicle's engine is translated throughout and regulated by the differential 25 to turn the wheels of the vehicle.

As discussed above, the ring gear 55 is susceptible to cracking from the stress exerted upon it in the conventional systems. To prevent such failure, the differential 25 may have to undergo a costly and extensive redesign. And even so, such a redesign does nothing to address previously manufactured and installed differentials 25. Embodiments of modified vehicle differential internals disclosed herein may resolve these issues at least in part.

With reference to FIGS. 3-18, an embodiment 100 for modified differential internals are described in an exemplary manner. The differential internals 100 described and shown herein may be used in models of the RZR line provided by Polaris Industries, Inc. of Medina, Minnesota. However, such is not intended to limit application of embodiments to such vehicles—embodiments of the differential internals 100 may be useable with other differentials from the same or a different manufacturer. The artisan would understand that, while certain scale, dimensions, and arrangement of features are depicted herein, and in the figures, such only describes an embodiment of the differential internals, and that modifications and variations of these dimensions and features are contemplated herein and within the scope of the disclosure. For example, the artisan would understand one or more feature size shown may be scaled up or down to readily modify any suitable vehicle differential. Furthermore, the artisan would understand that the components described herein may be made from any suitable material now known or subsequently developed, such as stamped steel.

With reference to FIGS. 3-5B and 14-17B, the modified differential internals 100 may comprise a spring retainer 110, an armature plate 120, a drive hub 130, a sprag plate 140, a ring gear sleeve 150, and an oil washer or spacer 160. The differential internals 100 may include and/or interact with other preexisting differential parts, such as the ring gear 55 and the sprag cage 60. Each of the components of the differential internals 100 may be a modified version (e.g., via cutting, welding, etc.) of a preexisting part, such as those from the differential 25. However, in embodiments, one or more parts of the differential internals 100 may be newly manufactured in accordance with the present disclosure. In this manner, a preexisting differential 25 may be retrofit with the differential internals 100 to mitigate the undesirable mechanical failure of the differential 25.

Figure 17A:
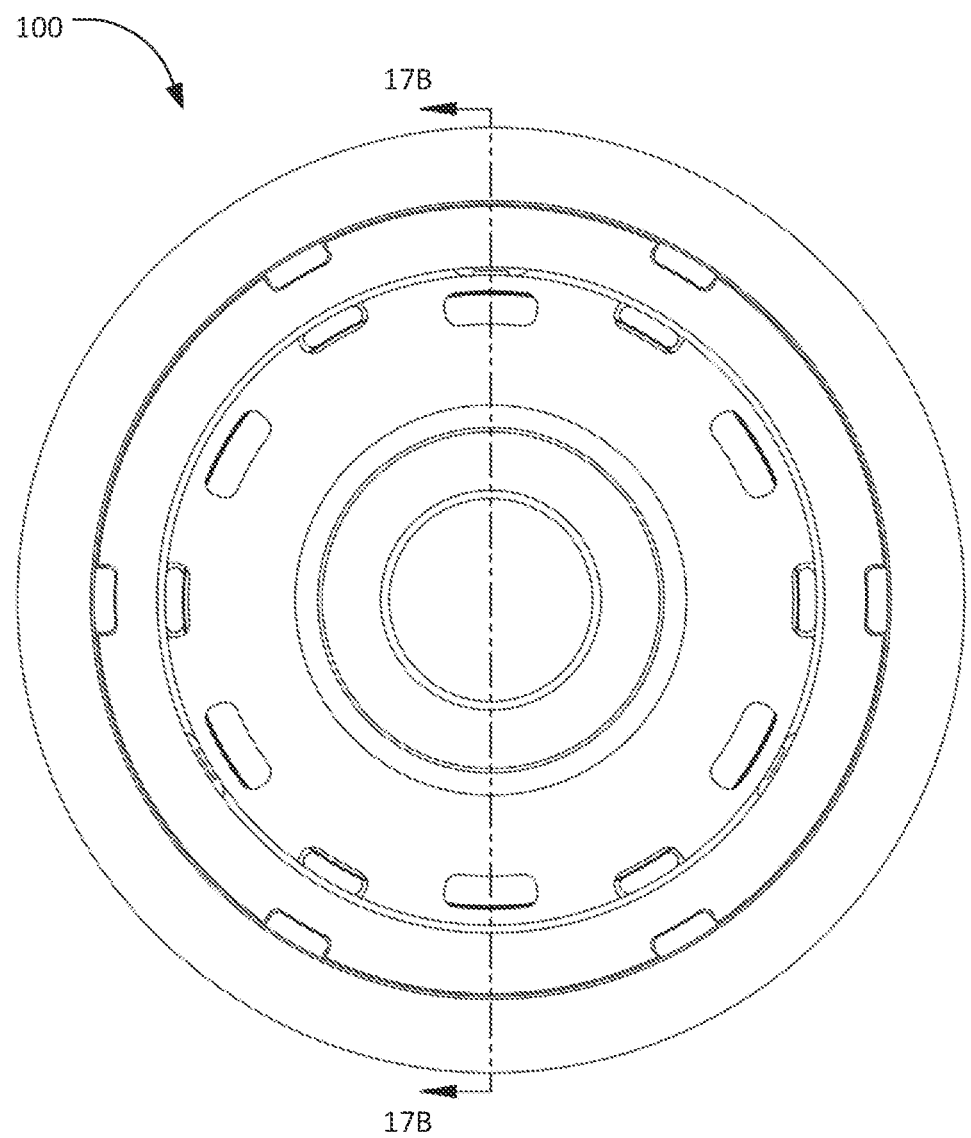
FIG. 17A is a front view of the modified differential internals of FIG. 14.
Figure 17B:
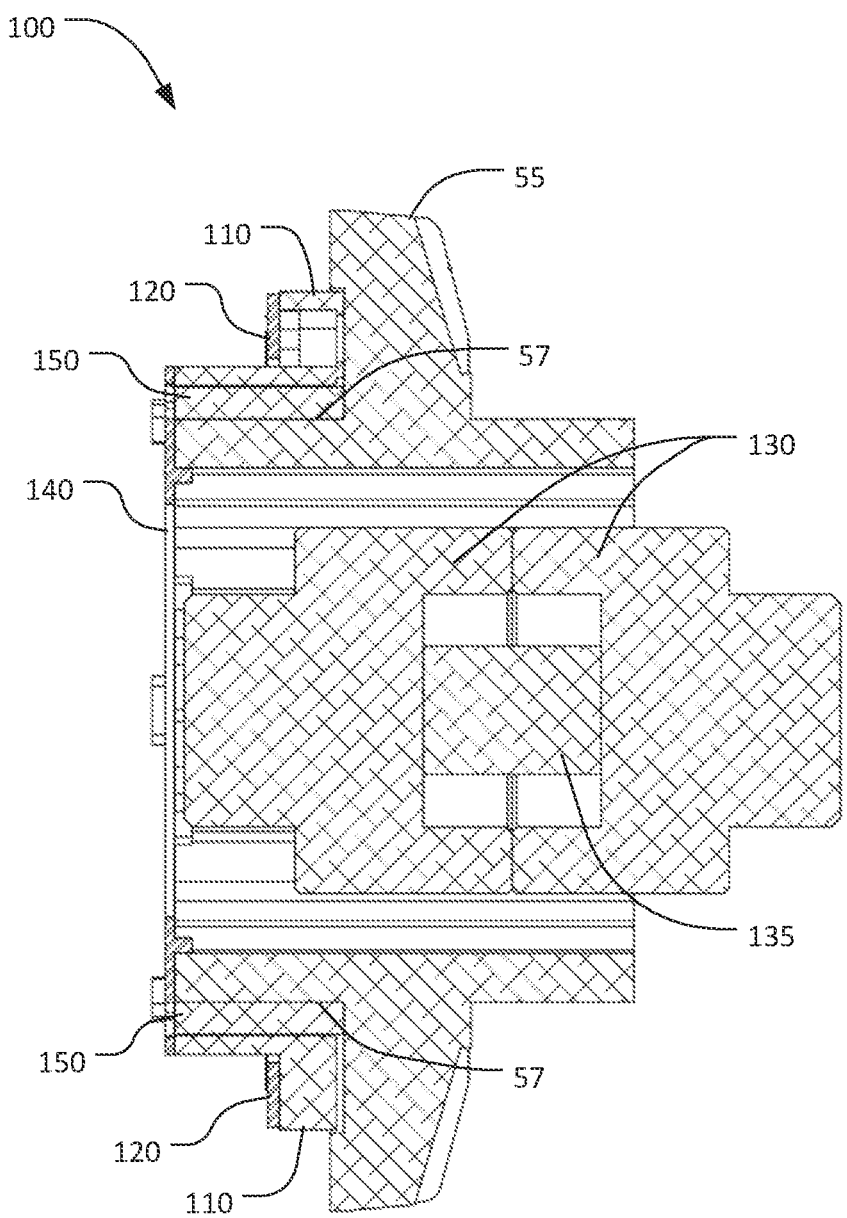
FIG. 17B is a section view of the modified differential internals of FIG. 17A.

The ring gear sleeve 150 (FIGS. 5A-5B) may have an inner diameter 151 such that it may fit around a portion of the ring gear 55 (e.g., as shown in FIG. 17B), and a thickness 155 that is about the same as the thickness of a hub or cylindrical wall 57 (FIG. 2) of the ring gear 55 that the ring gear sleeve 150 is to be fit around. In embodiments, the ring gear sleeve 150 thickness may be approximately 0.43 mm. The ring gear sleeve 150 may be fixedly attached (e.g., via welding) to the cylindrical wall 57 of the ring gear 55 such that an effective diameter or thickness of the cylindrical wall 57 is increased by an amount equal to two times the thickness 155. With this increase in thickness may come benefits such as increased resistance to wear and tear, and a reduction in susceptibility to mechanical failure relative to conventional systems.

Figures 6A, 6B:
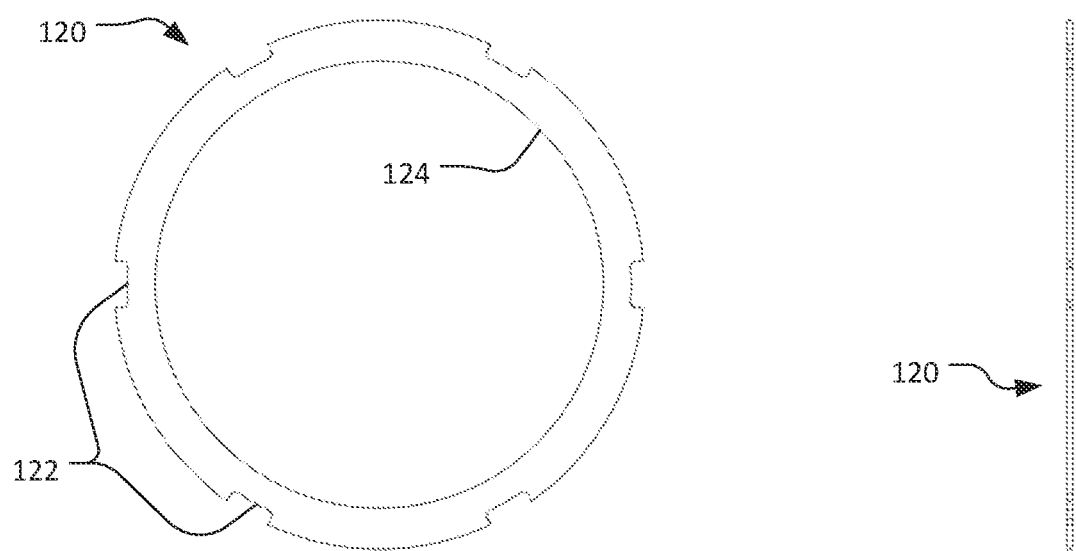
FIG. 6A is a top view of an armature plate of the modified differential internals of FIG. 3.
FIG. 6B is a side view of the armature plate of the modified differential internals of FIG. 3.
Figures 7A, 7B:
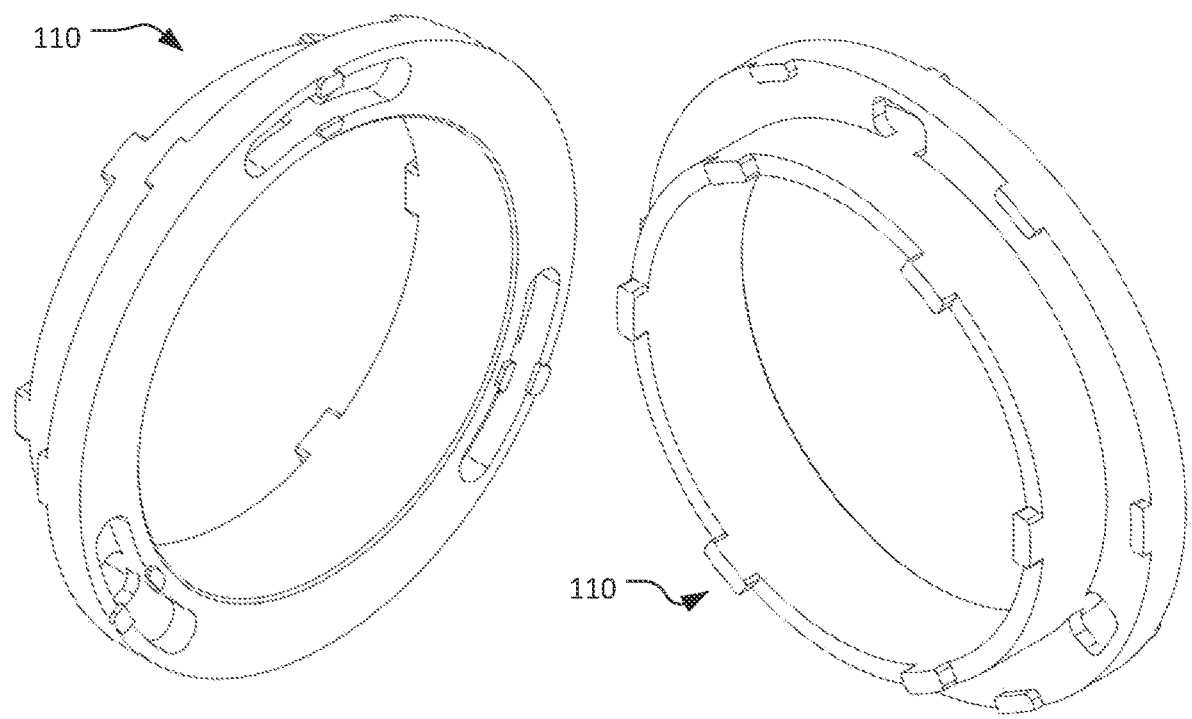
FIG. 7A is a perspective view of a spring retainer of the modified differential internals of FIG. 3.
FIG. 7B is another perspective view of the spring retainer of the modified differential internals of FIG. 3.
Figure 8A:
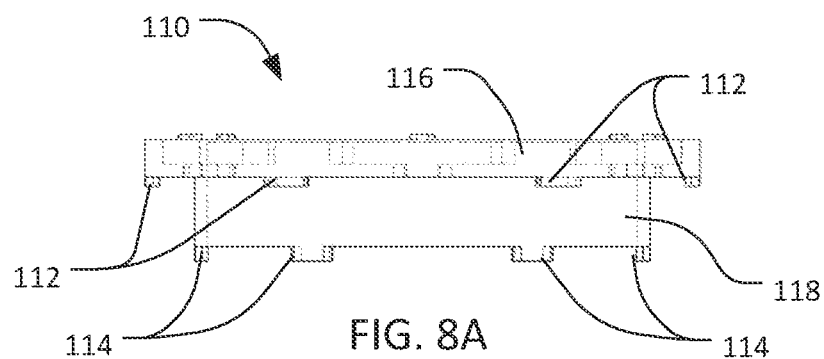
FIG. 8A is a side view of the spring retainer of the modified differential internals of FIG. 3.
Figure 8B:
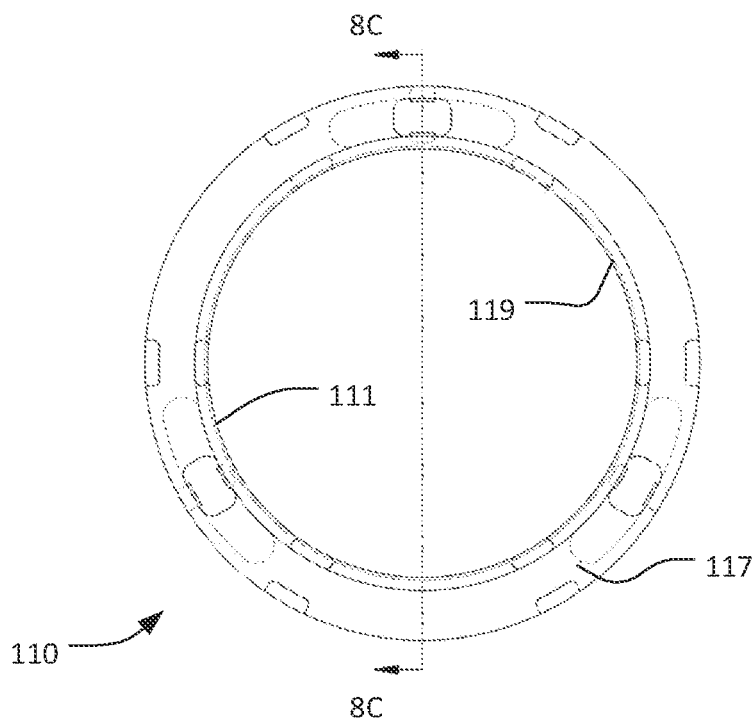
FIG. 8B is a top view of the spring retainer of the modified differential internals of FIG. 3.
Figure 8C:
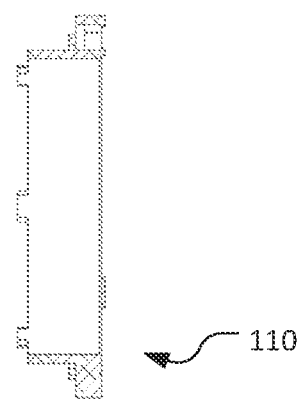
FIG. 8C is a section view of the spring retainer of FIG. 8B.
Figure 8D:
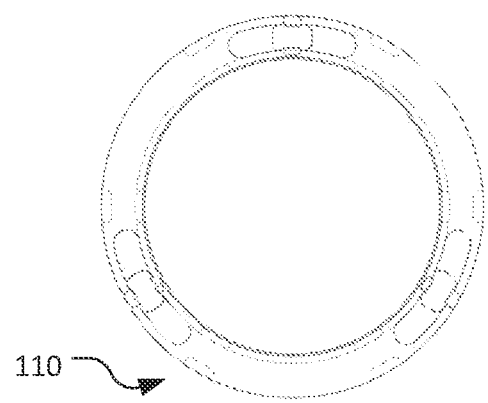
FIG. 8D is a bottom view of the spring retainer of the modified differential internals of FIG. 3.

However, as discussed above, increasing the thickness of the cylindrical wall 57 creates a cascade of issues where other parts of the differential 25 may no longer fit. Thus, the differential internals 100 may include, among other parts, the armature plate 120 (FIGS. 6A-6B). The armature plate 120, like other portions of the internals 100, may be a conventional part that is modified according to the present disclosure. For instance, the armature plate 120 may have an inner diameter 124 that is increased (e.g., via machining) an amount which approximately matches the thickness of the ring gear sleeve 150 such that the armature plate 120 may fit around both the cylindrical wall 57 of the ring gear 55 and the ring gear sleeve 150, among other parts. Locking tabs previously existing on the armature plate 120 may be removed.

To couple the armature plate 120 to the spring retainer 110, the armature plate 120 may instead have a plurality (e.g., six) armature slots 122 formed therein. These armature slots 122 may be configured to fit with and be retained by armature tabs or lugs 112 (see FIG. 8A) formed on the spring retainer 110. When the armature plate 120 is acted upon by motion of the ring gear 55, the armature plate 120 may translate the motion to the spring retainer 110 through these armature slots 122 and armature lugs 112. In embodiments, the armature plate 120 may have an increased thickness relative to the prior art (e.g., the armature plate 120 may be about 0.060 mm thick) such that the armature plate 120 may have a reduced likelihood of mechanical failure.

The spring retainer 110, in the embodiment shown in FIGS. 7A-8D, includes an annular flange or base flange 116 projecting radially outward from a cylindrical sleeve 118. The armature lugs 112 may project outward from a first outwardly facing surface 117 of the base flange 116, and spring tabs or lugs 114 may extend outward from a second outwardly facing surface 119 of the cylindrical sleeve 118. The base flange 116 and its first outwardly facing surface 117 may extend perpendicular to the cylindrical sleeve 118 with the second outwardly facing surface 119 of the cylindrical sleeve 118 extending in a plane that is parallel to a plane extending across the first outwardly facing surface 117 of the base flange 116. In operation, the spring retainer 110 may couple the armature plate 120 and the sprag plate 140 together, while translating motion therebetween. This translated motion may be damped by springs (not shown) of the spring retainer 110. The spring retainer 110, similar to the armature plate 120, may have an inner diameter 111 that is increased (e.g., proportionally to the ring gear sleeve 150 thickness 155) in relative to a conventional spring retainer such that the combined total diameter of the ring gear 55 with the ring gear sleeve 150 may be accommodated.

Figure 9:
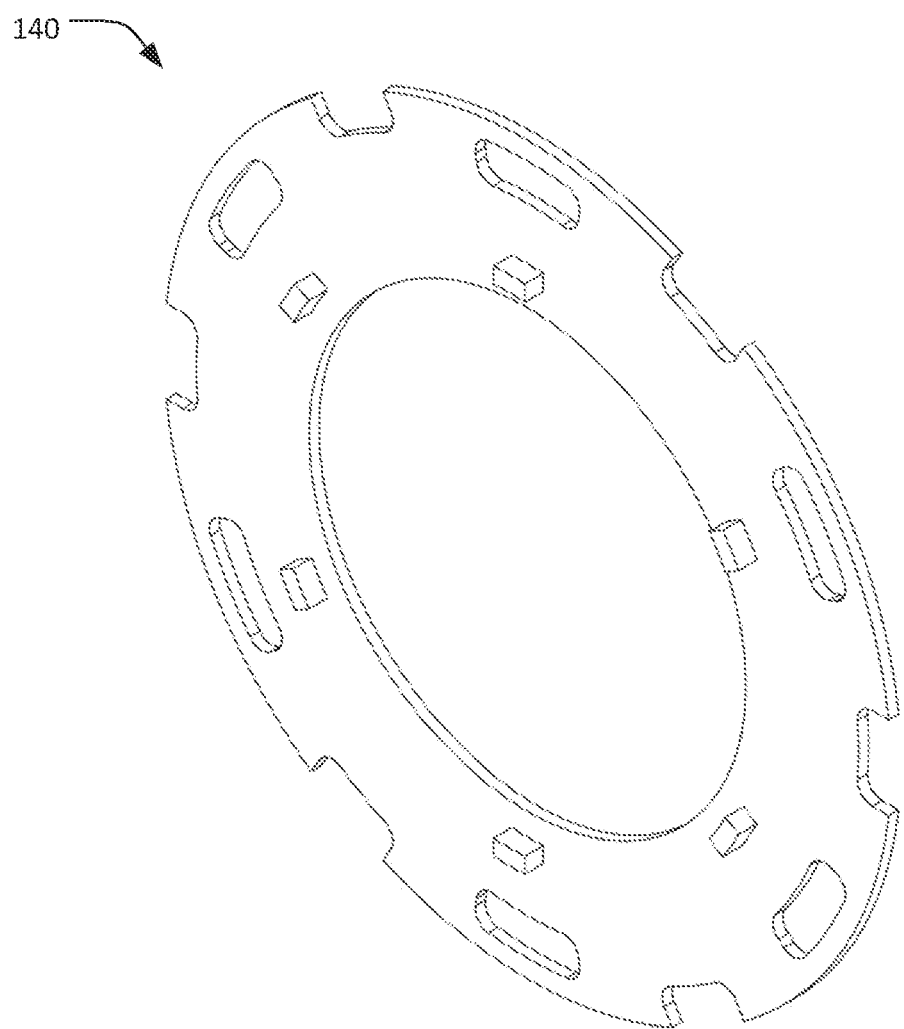
FIG. 9 is a perspective view of a sprag plate of the modified differential internals of FIG. 3.
Figures 10A, 10B:
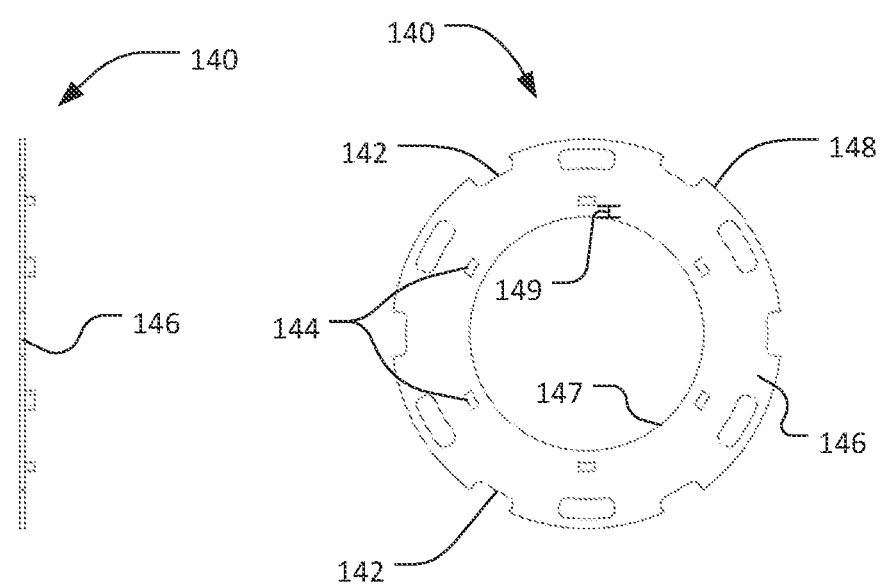
FIG. 10A is a side view of the sprag plate of the modified differential internals of FIG. 3.
FIG. 10B is a bottom view of the sprag plate of the modified differential internals of FIG. 3.

The sprag plate 140, shown in FIGS. 9-1013, is preferably formed as a relatively flat, annular ring and may have both spring retainer slots 142 and locking tabs 144 for coupling with the spring retainer 110 and the sprag cage 60, respectively. In embodiments, the sprag cage 60 may be fixedly secured to the sprag plate 140 through welding the locking tabs 144 to the sprag cage 60. As such, the locking tabs 144 may be formed entirely within the boundaries of the surface 146 such that the locking tabs 144 do not meet or extend beyond an inner perimeter 147 and an outer perimeter 148 of the sprag plate 140. In some embodiments, the locking tabs 144 may be spaced some non-zero distance 149 from the inner perimeter 147. The spring retainer slots 142 may be located around an outer periphery or perimeter of the sprag plate 140, and the locking tabs 144 may protrude from a surface 146 of the sprag plate 140. In operation, the sprag plate 140 may couple spring retainer 110 to the sprag cage 60 for the translation of motion therebetween. In embodiments, the spring retainer slots 142 and the locking tabs 144 may be added to an existing sprag plate, such as through additive and/or subtractive manufacturing.

Figure 11A:
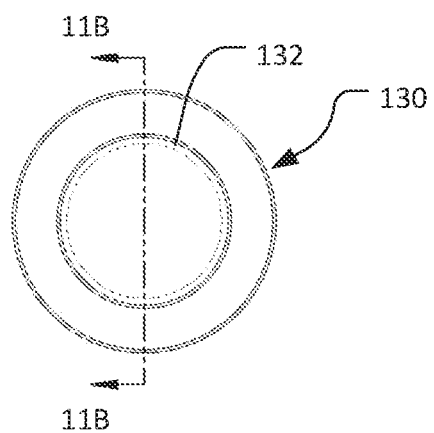
FIG. 11A is a top view of a drive hub of the modified differential internals of FIG. 3.
Figure 11B:
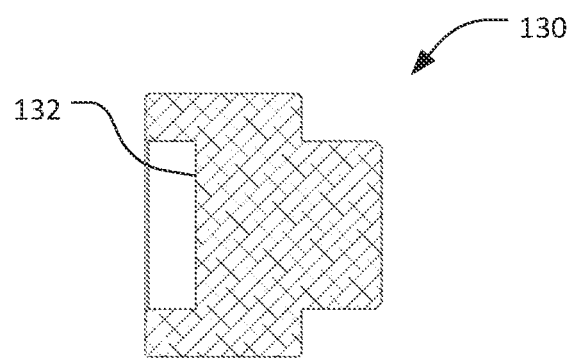
FIG. 11B is a section view of the drive hub of FIG. 11A.
Figure 12A:
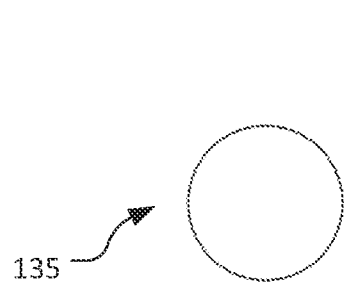
FIG. 12A is a top view of a drive hub pin of the modified differential internals of FIG. 3.
Figure 12B:
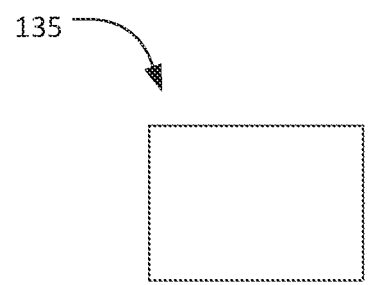
FIG. 12B is a side view of the drive hub pin of the modified differential internals of FIG. 3.

FIGS. 11A and 11B depict a drive hub 130. The drive hub 130 may have a bore 132 created therein such that the drive hub 130 may retain one or more roller bearings. In use, the differential internals 100 may use a plurality of these drive hubs 130. For example, the differential internals 100 may comprise two drive hubs 130 that are bridged by an interceding pin 135 (see FIGS. 12A-12B) that resides within the bores 132. These two drive hubs 130 may be rotated by the rollers of the sprag cage 60 in contact with the hubs 130, and this motion may be used to turn the axles of a vehicle wheel. In embodiments, the drive hubs 130 may include further modifications, such as a spacer or oil plate 160 (FIG. 15) placed between two drive hubs 130, adding oil grooves in the drive hub 130 to facilitate the proper spread of oil therearound, and/or splines added to a drive hub 130 surface which contacts the axle which turns the vehicle wheel. In operation, these modifications to the drive hub 130 may provide for a drive hub 130 that is precluded from "floating" back and forth within the differential 25, a problem conventional differentials face. All in all, the modified drive hub 130 may be less susceptible to the wear and tear conventional drive hubs face, thus providing for a drive hub which is relatively less likely to mechanically fail.

Figure 18:
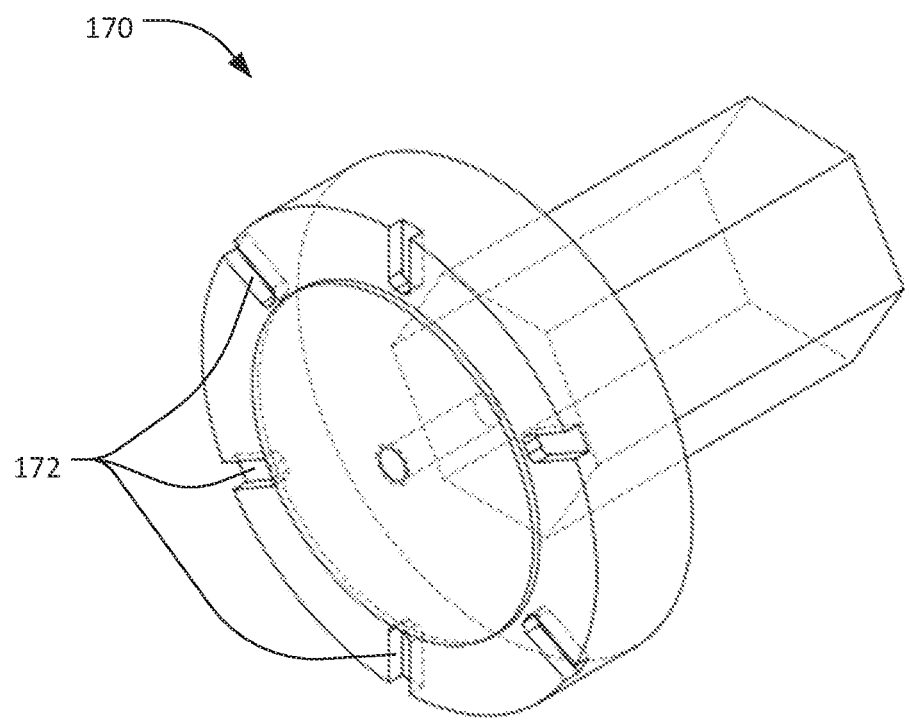
FIG. 18 is a perspective view of a sprag indexing tool of the modified differential of FIG. 3.

FIG. 18 depicts a sprag plate indexing tool 170 which may be used in some embodiments. The indexing tool 170 may have a plurality of slots 172 which correspond to the plurality of locking tabs 144 on the sprag plate 140.

Figure 13:
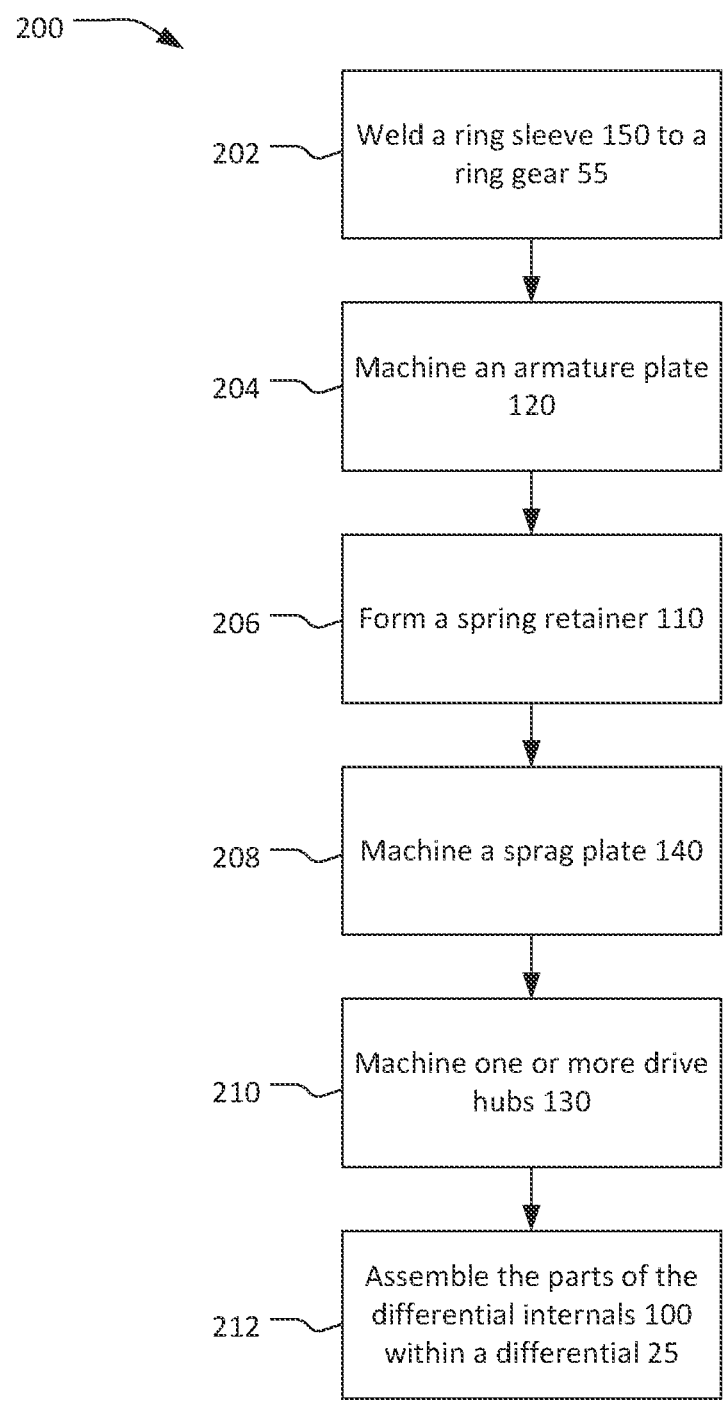
FIG. 13 is a block diagram depicting method steps of manufacturing a differential having the modified differential internals of FIG. 3.
Figure 14:
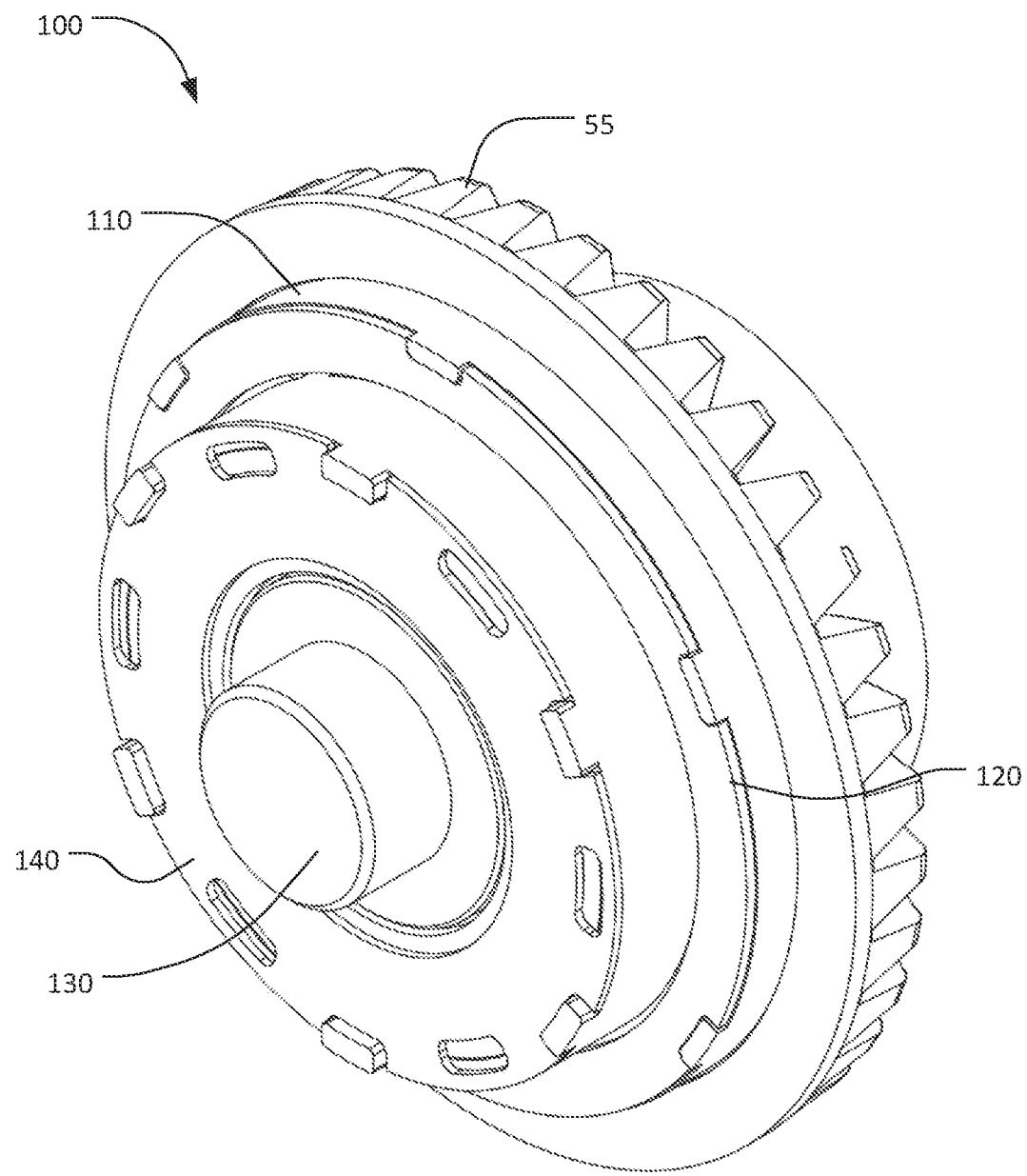
FIG. 14 is another perspective view of the modified differential internals of FIG. 3, with a sleeved ring gear.
Figure 15:
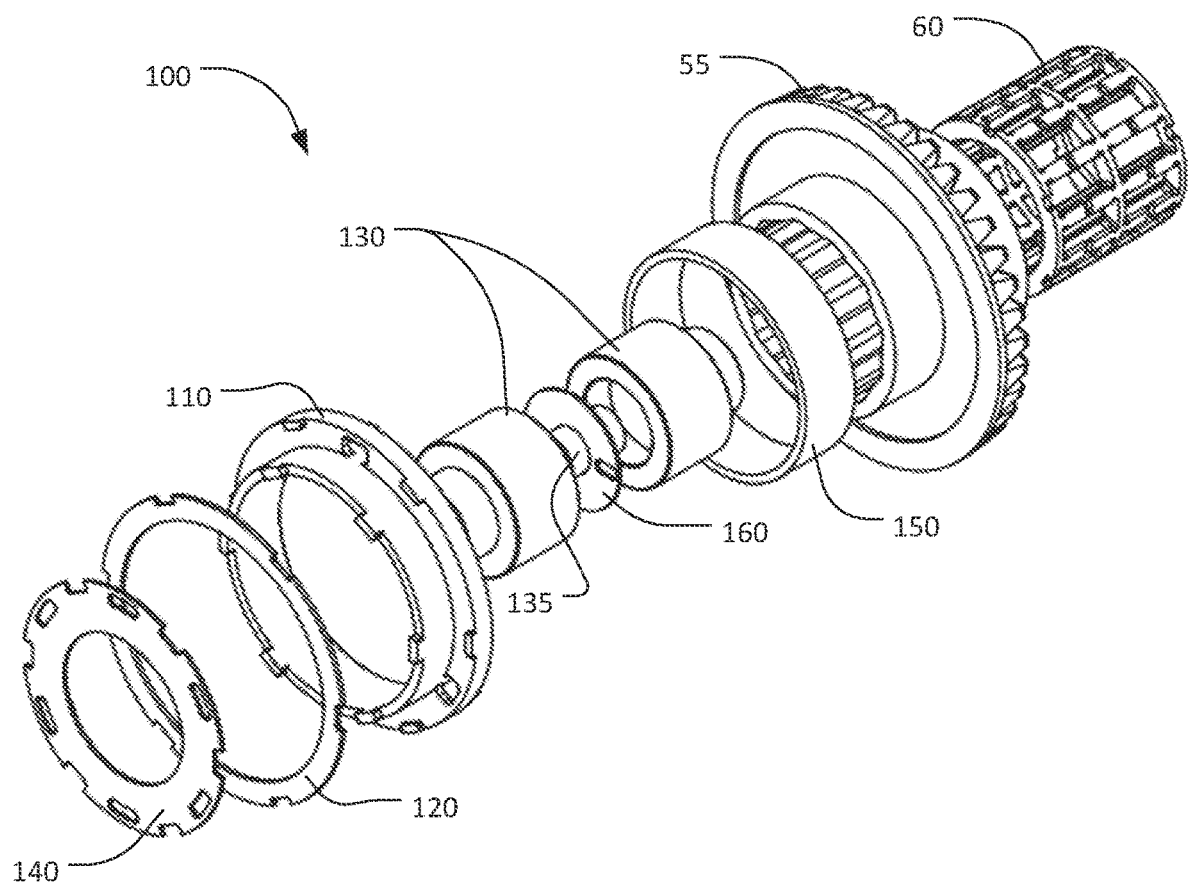
FIG. 15 is an exploded view of the modified differential internals of FIG. 14.
Figure 16A:
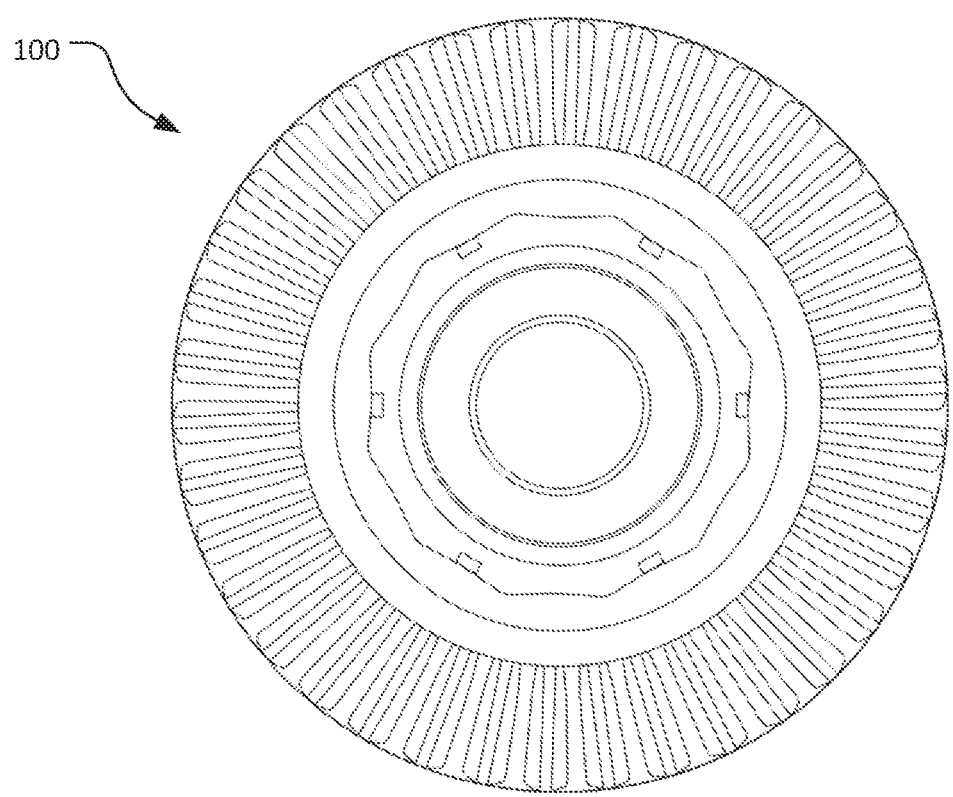
FIG. 16A is a rear view of the modified differential internals of FIG. 14.
Figure 16B:
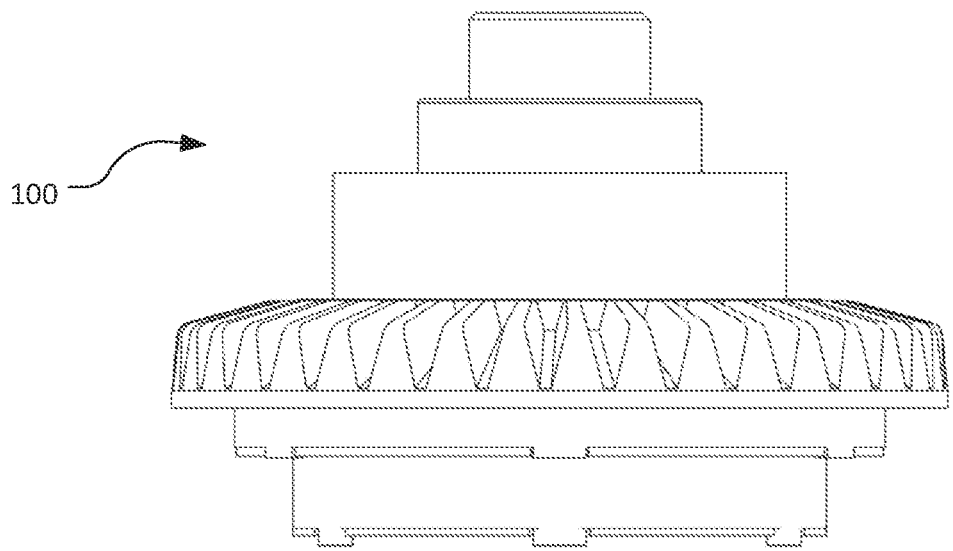
FIG. 16B is a side view of the modified differential internals of FIG. 14.

FIG. 13 is a block diagram depicting a method 200 of operating, manufacturing, and/or installing the various embodiments of the modified differential internals described herein. Firstly, at step 202, a preexisting ring gear 55 may have a ring gear sleeve 150, having a thickness 155, attached thereto through any suitable method now known or subsequently developed. For example, the ring gear sleeve 150 may be welded to an outer perimeter of the wall 57 of the ring gear. Then, at step 204, a preexisting armature plate may be formed into the armature plate 120, for example, by including spring retainer slots 122 therein and by increasing an inner diameter 124 thereof, as discussed above. Next, at step 206, the spring retainer 110 may be provided, such as through manufacturing the part per the disclosure herein. Then, at step 208, a preexisting sprag plate 140 may be machined or otherwise formed, by including spring retainer slots 142 and by adding a plurality of locking tabs 144 to a surface 146 (e.g., a sprag plate 140 bottom surface) thereof, as discussed above. Next, at step 210, one or more preexisting drive hubs may be formed into the drive hubs 130 by, for example, adding a bore 132, a drive pin 135, a spacer 160, and/or roller bearings in the drive hub 130. Finally, at step 212, the differential internals 100 may be assembled inside the differential 25. For instance, the drive hub 130 and the sprag cage 60 may be placed with the ring gear 55 having the ring gear sleeve 150. These parts may be located within a differential 25. The spring retainer 110 may be placed around the ring gear 55 having the affixed ring gear sleeve 150. The armature plate 120 may be located on the first outwardly facing surface 117 of the spring retainer 110 and engage with the armature lugs 112. The sprag plate 140 may be placed such that it engages both the spring retainer 110 (e.g., with the retainer slots 142) and the sprag cage 60 (e.g., with the locking tabs 144). At this point, the differential 25 may be ready for use in a vehicle.

It is to be understood that the steps of the method 200 may be carried out in a different order than as described herein. It is also to be understood that steps of the method 200 may be readily modified, added to, and/or omitted, and that such changes are contemplated and within the scope of the present disclosure. For instance, the one or more steps of machining preexisting parts for the differential internals 100 may be readily modified to manufacturing new pieces that serve the same function as described above. As another example, the step of assembling the pieces of the differential internals 100 within a differential 25 may take place where the internals 100 are already provided for.

The differential 25 modified by the differential internals 100 may operate by having a pinion or side gear driven by a vehicle engine, which in turn drives the ring gear 55. The ring gear 55, reinforced by the ring gear sleeve 150, may translate this motion to the armature plate 120. The armature plate 120, coupled with both the spring retainer 110 and the sprag plate 140, may rotate in response to the ring gear 55 motion. The spring retainer 110 may dampen the motion of the armature plate 120, thus the sprag plate 140 may only receive a portion of the motion of the armature plate 120. The sprag plate 140 responds to this received dampened rotation by rotating the sprag cage 60 with rollers. The rotating sprag cage 60 engages the drive hub 130, which itself is engaged with an axle of the vehicle. As such, the original motion provided by the vehicle engine may translated throughout and regulated by the differential 25 and the modified differential internals 100 to turn the wheels of the vehicle.

As discussed above, the modified differential internals 100 may have a reduced chance for mechanical failure relative to the conventional differential system 25. For example, the ring gear 55, reinforced with the ring gear sleeve 150, may have a reduced susceptibility to cracking, or otherwise failing, relative to the conventional systems. These advantages may be gained without having to repair, replace, and/or redesign the entire vehicle differential, which may save a user a significant amount of time, effort, and money. By being able to retrofit a conventional differential with the differential internals 100, the previously unsatisfactory differential may be modified to withstand greater wear and tear.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A modified internals system for a vehicle differential, the system comprising:
  a preexisting ring gear having a perimeter;
  a ring gear sleeve having a thickness, the ring gear sleeve being affixed to the ring gear perimeter;

a spring retainer having a first surface and a second surface, the first surface having a first set of lugs and the second surface having a second set of lugs;

an armature plate having a plurality of slots configured to engage the first set of lugs; and a sprag plate having a plurality of slots configured to engage the second set of lugs, the sprag plate having a plurality of locking tabs configured to engage a sprag cage of the vehicle differential.

2. The system of claim 1 wherein the armature plate and the sprag plate are machined from preexisting parts.

3. The system of claim 1, wherein the first surface of the spring retainer extends perpendicularly from the second surface of the spring retainer.

4. The system of claim 1, wherein the thickness of the ring gear sleeve is about 0.43 mm.

5. The system of claim 1, wherein the ring gear sleeve is affixed to the ring gear perimeter via welding.

6. The system of claim 1, further comprising a plurality of drive hubs configured to engage the sprag cage of the vehicle differential.

7. The system of claim 6, further comprising a drive hub pin, wherein each of the plurality of drive hubs has a bore formed therein configured to fit the drive hub pin.

8. The system of claim 6, wherein the spring retainer is configured to translate motion from the armature plate to the sprag plate, and the sprag plate is operably coupled to the plurality of drive hubs.

9. The system of claim 1, wherein the locking tabs of the sprag plate are formed a distance from an inner perimeter of the sprag plate.

10. The system of claim 1, wherein the sprag plate is welded to the sprag cage.

11. The system of claim 1, wherein the armature plate is configured to fit around the ring gear sleeve affixed to the ring gear.

12. The system of claim 1, wherein the spring retainer is configured to fit around the ring gear sleeve affixed to the ring gear.

13. The system of claim 1, wherein the ring gear sleeve thickness is about equal to a thickness of a cylindrical wall of the ring gear.

14. A method of modifying internals of a vehicle differential, the method comprising the steps of:

welding a ring gear sleeve having a thickness to a perimeter of a preexisting ring gear;

providing a spring retainer, the spring retainer having a first surface and a second surface, the first surface having a first set of lugs and the second surface having a second set of lugs;

machining an armature plate, the armature plate having a plurality of slots configured to engage the first set of lugs;

machining a sprag plate, the sprag plate having a plurality of slots configured to engage the second set of lugs and having a plurality of locking tabs configured to engage a sprag cage of the vehicle differential; and assembling each of the ring gear, the spring retainer, the armature plate, and the sprag plate within the vehicle differential.

15. The method of claim 14, wherein the armature plate and the sprag plate are machined from preexisting parts.

16. The method of claim 14, further comprising the step of machining a plurality of drive hubs by forming a bore in each of the plurality of drive hubs.

17. A modified internals system for a vehicle differential, the system comprising:

a ring gear having a cylindrical wall and a perimeter, the cylindrical wall having a first thickness;

a ring gear sleeve having a second thickness, the ring gear sleeve being welded to the ring gear perimeter;

a spring retainer having a first surface and a second surface extending perpendicularly from the first surface, the first surface having a first set of lugs extending in a direction, and the second surface having a second set of lugs extending in the direction;

an armature plate having a plurality of slots configured to engage the first set of lugs and an inner perimeter configured to fit around the ring gear sleeve;

a sprag cage having rollers; and a sprag plate having a plurality of slots configured to engage the second set of lugs, the sprag plate having a plurality of locking tabs configured to engage the sprag cage.

18. The system of claim 17, wherein the first thickness and the second thickness are equivalent.

19. The system of claim 17, further comprising:

a plurality of drive hubs configured to operably couple to the sprag cage; and an oil spacer configured to fit between the plurality of drive hubs.

* * * * *